United States Patent
Masuda et al.

(10) Patent No.: US 8,279,284 B2
(45) Date of Patent: Oct. 2, 2012

(54) VIDEO DISPLAY APPARATUS

(75) Inventors: Koji Masuda, Higashimurayama (JP); Masaru Fujii, Kodaira (JP); Atsushi Honda, Kokubunji (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 869 days.

(21) Appl. No.: 12/395,686

(22) Filed: Mar. 1, 2009

(65) Prior Publication Data
US 2009/0219453 A1 Sep. 3, 2009

(30) Foreign Application Priority Data
Mar. 3, 2008 (JP) ................... 2008-052457

(51) Int. Cl.
*H04N 17/18* (2006.01)
(52) U.S. Cl. ........................ 348/159; 348/143
(58) Field of Classification Search .................. 348/159, 348/143
See application file for complete search history.

(56) References Cited

U.S. PATENT DOCUMENTS

| | | | |
|---|---|---|---|
| 6,639,649 B2* | 10/2003 | Fredlund et al. ................ 352/12 |
| 6,646,679 B2* | 11/2003 | Ishibe et al. .............. 348/207.99 |
| 6,977,667 B1* | 12/2005 | Burke .......................... 715/723 |
| 7,702,135 B2* | 4/2010 | Hill et al. ...................... 382/107 |
| 8,134,606 B2* | 3/2012 | Fisher et al. ................ 348/218.1 |
| 2004/0037540 A1* | 2/2004 | Frohlich et al. ................. 386/96 |
| 2007/0121009 A1* | 5/2007 | Katayama et al. ............ 348/553 |
| 2008/0158591 A1* | 7/2008 | Eum .......................... 358/1.15 |
| 2009/0066795 A1* | 3/2009 | Wollmershauser et al. .. 348/159 |
| 2009/0244283 A1* | 10/2009 | Beier ........................... 348/148 |
| 2010/0033552 A1* | 2/2010 | Ogawa .......................... 348/36 |

FOREIGN PATENT DOCUMENTS
JP 2002-152721 5/2002
* cited by examiner

*Primary Examiner* — John Follansbee
*Assistant Examiner* — Anthony Mejia
(74) *Attorney, Agent, or Firm* — Bacon & Thomas, PLLC

(57) ABSTRACT

A video display apparatus includes a reception unit configured to receive a plurality of sequence of video signals output from a plurality of cameras, a storage unit configured to store the plurality of sequence of video signals received by the reception unit, a display unit configured to include the first and second display areas, and a control unit. The control unit selectively and time-divisionally displays the plurality of sequence of video signals received by the reception unit on the first display area, and along with the display operation, selectively reads out from the storage unit a non-displayed section of the plurality of sequence of video signals which have been received by the reception unit, and displays the readout section on the second display area.

10 Claims, 7 Drawing Sheets

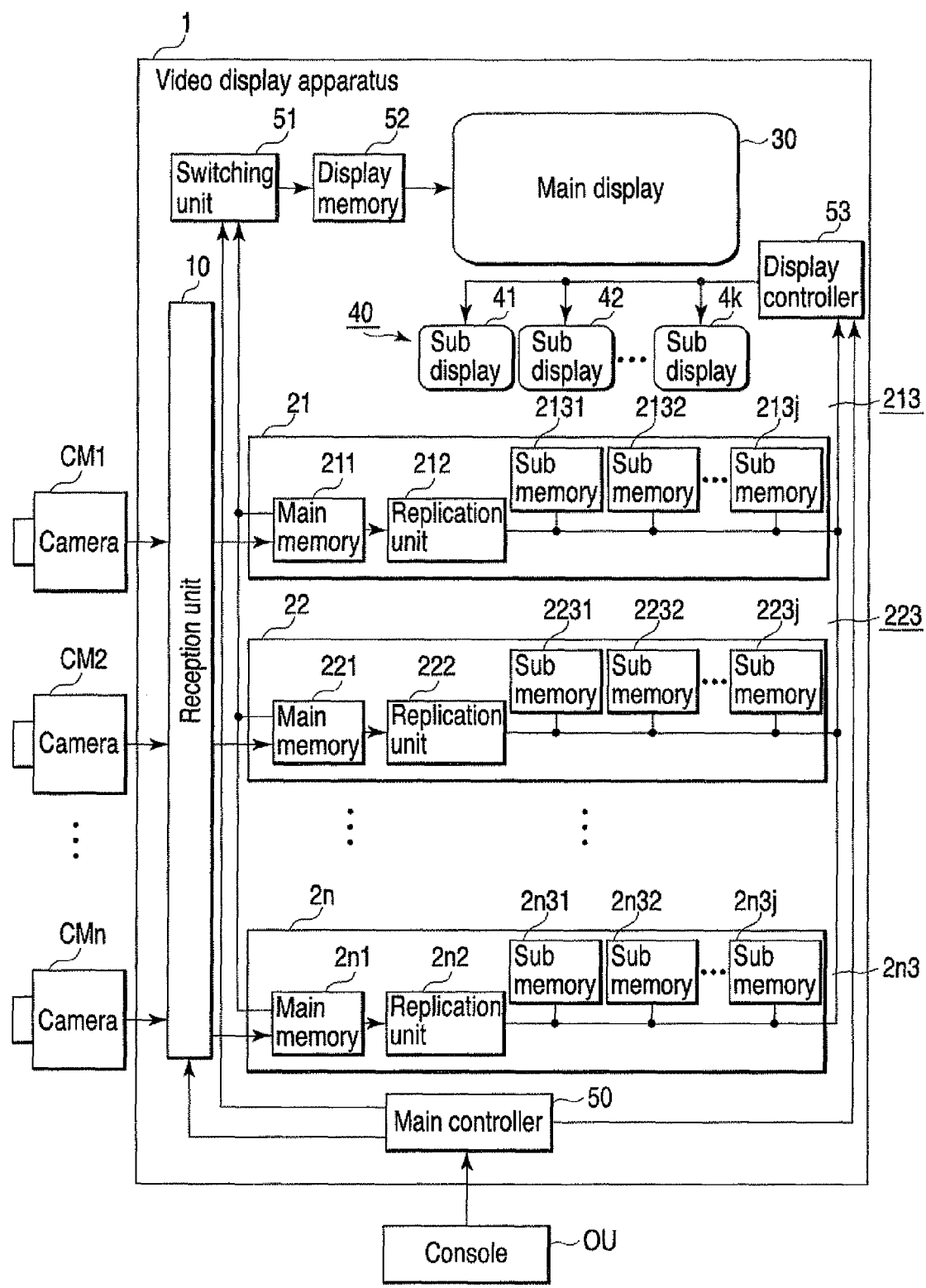
F I G. 1

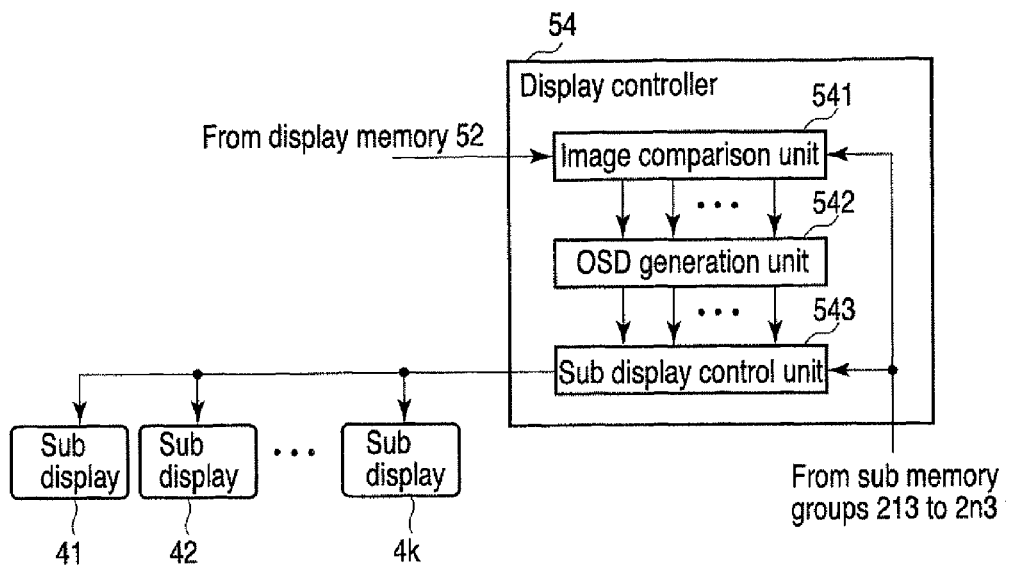
F I G. 6
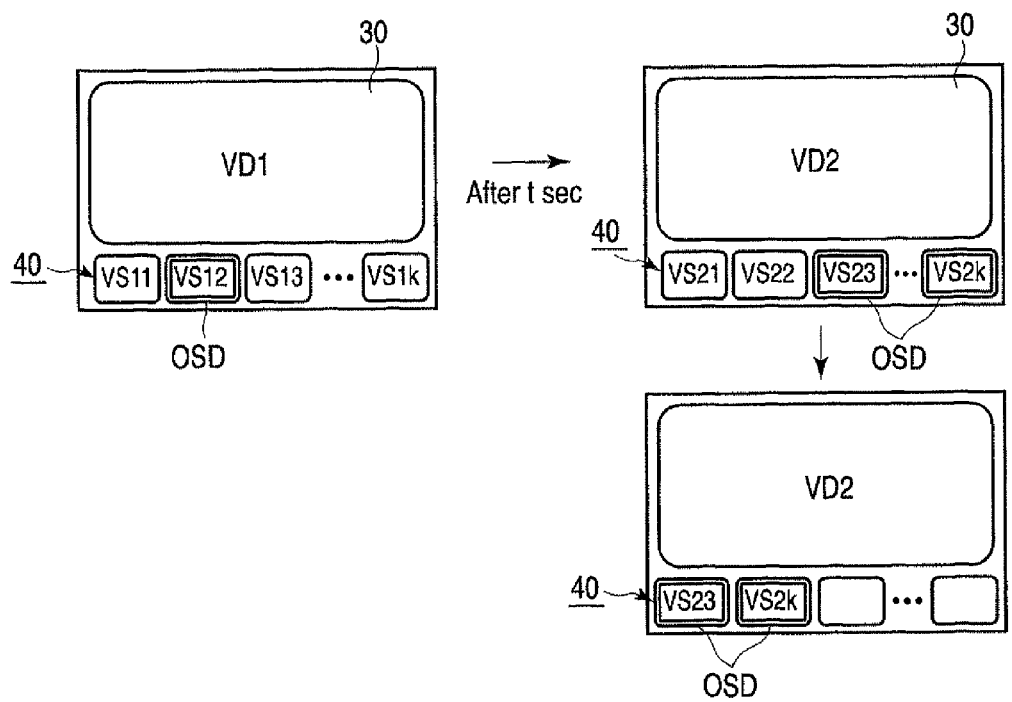
F I G. 7

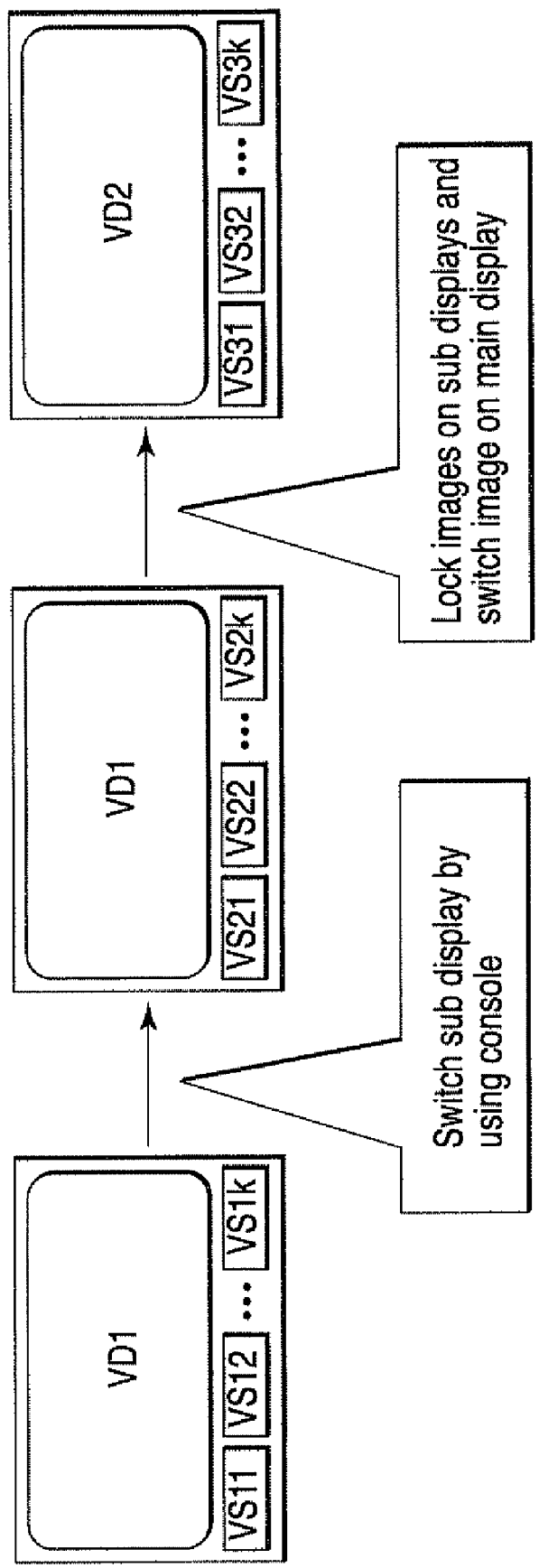
F I G. 8

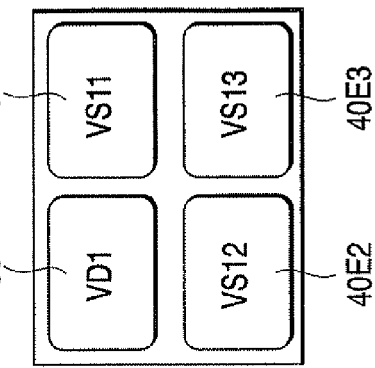
FIG. 10
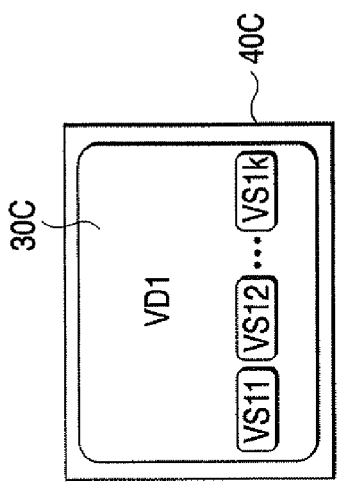
FIG. 9
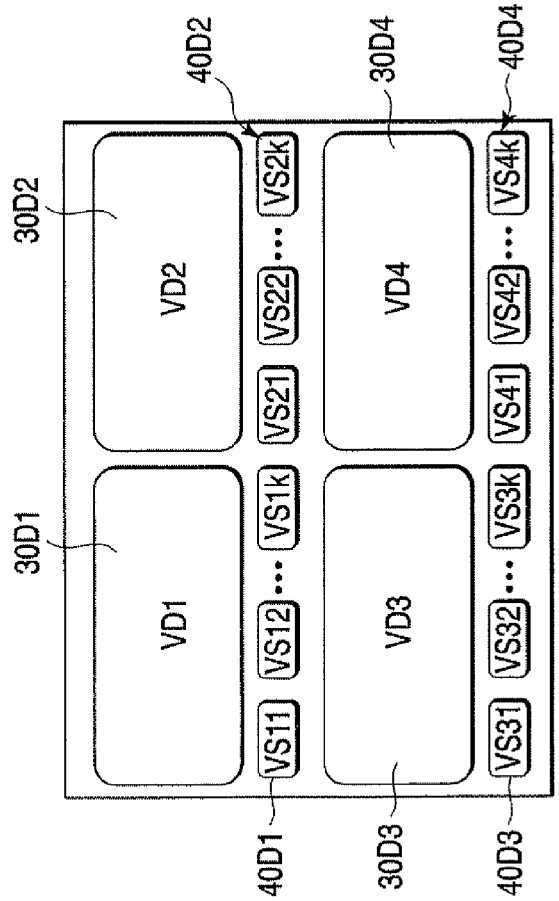
FIG. 12
FIG. 11

VIDEO DISPLAY APPARATUS

CROSS-REFERENCE TO RELATED APPLICATIONS

This application is based upon and claims the benefit of priority from prior Japanese Patent Application No. 2008-052457, filed Mar. 3, 2008, the entire contents of which are incorporated herein by reference.

BACKGROUND OF THE INVENTION

1. Field of the Invention

The present invention relates to a video display apparatus which displays, e.g., monitor videos captured by monitoring cameras.

2. Description of the Related Art

Conventionally, monitoring systems are set up in commercial facilities such as hotels, office buildings, convenience stores, and financial institutions, as well as in public facilities such as dams, railroads, roads, and schools, for the purpose of deterring crime and preventing accidents. Such monitoring systems, for example, capture a monitoring area by a camera, transmit the video signal to a monitoring center such as a management office or security office, and display the video signal on a display. With this system, an operator can monitor the presence/absence of intruders by visually checking the display at the monitoring center.

When a plurality of cameras are used in this type of monitoring system, it is a common practice to sequentially switch the video signals of the plurality of cameras at predetermined intervals, and display the switched video signal on the display. In such display method, however, it is possible to display the video signal of only one of the plurality of cameras at one time. This may cause some important videos to be missed, and decrease the reliability of the monitoring operation.

For example, an apparatus which has a multi-screen display, and displays the video signals of a plurality of cameras on the plurality of screens at one time has been conventionally proposed (see, e.g., Jpn. Pat. Appln. KOKAI Publication No. 2002-152721). Such apparatus allows an operator to simultaneously monitor the video signals of the plurality of cameras while the video signals are arranged on the display.

In such conventional video display apparatus, however, the display screen must be divided into at least the number of screens which is obtained by multiplying the number of cameras with the number of events to be displayed, thereby complicating the process of arranging a plurality of screens. Since the size of each screen is small, performing the visual check is also difficult.

BRIEF SUMMARY OF THE INVENTION

It is an object of the present invention to provide a video display apparatus which prevents video signals from being overlooked without using a complex and large-scale display means, thereby making it possible to offer a highly reliable monitoring service with a simpler arrangement.

In order to achieve the above object, an aspect of the present invention includes a reception unit configured to receive a plurality of sequence of video signals output from a plurality of cameras, a storage unit configured to store the plurality of sequence of video signals received by the reception unit, a display unit configured to include the first and second display areas, and a control unit. The control unit selectively and time-divisionally displays the plurality of sequence of video signals received by the reception unit on the first display area, and along with the display operation, selectively reads out from the storage unit a non-displayed section of the plurality of sequence of video signals which have been received by the reception unit, and displays the readout section on the second display area.

As a display control method performed by the control unit, the following methods can be considered. That is, the control unit generates a plurality of still videos in time sequence on the basis of the video signals which have been received by the reception unit, and displays the plurality of generated still videos on the second display area. Alternatively, when the non-displayed section of the video signals displayed on the second display area is longer than the display period of a sequence of video signals on the first display area, the control unit converts the speed of the non-displayed section of the video signals, and displays the non-displayed section on the second display area in a fast-forward mode.

It is therefore possible to selectively and time-divisionally display the plurality of sequence of video signals output from the plurality of cameras on the first display area, while selectively displaying the non-displayed section of the plurality of sequence of video signals which have been received on the second display area. Although only one of the plurality of sequence of video signals is displayed on the first display area at one time, the section of the video signals which has not been displayed on the first display area is read out from the storage unit and displayed on the second display area. The operator can therefore monitor one of the plurality of sequence of video signals in real time, while monitoring the non-displayed section of the video signals being displayed or of other sequence of video signals.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the preferred embodiments given below, serve to explain the principles of the invention.

FIG. 1 is a block diagram showing the arrangement of a video display apparatus according to the first embodiment of the present invention;

FIG. 6 is a block diagram showing the functional arrangement of a display controller of a video display apparatus according to the second embodiment of the present invention;

FIG. 7 is a view showing an overview of a video display operation on main display and sub-displays which are controlled by the display controller shown in FIG. 6;

FIG. 8 is a view showing an overview of a video display operation on a main display and sub-displays according to the third embodiment of the present invention;

FIG. 9 is a view showing the first example of the arrangement of a main display and sub-displays according to other embodiments of the present invention;

FIG. 10 is a view showing the second example of the arrangement of a main display and sub-displays according to other embodiments of the present invention;

FIG. 11 is a view showing the third example of the arrangement of main displays and sub-displays according to other embodiments of the present invention; and FIG. 12 is a view showing the fourth example of the arrangement of a main display and sub-displays according to other embodiments of the present invention.

DETAILED DESCRIPTION OF THE INVENTION

Figure 2:
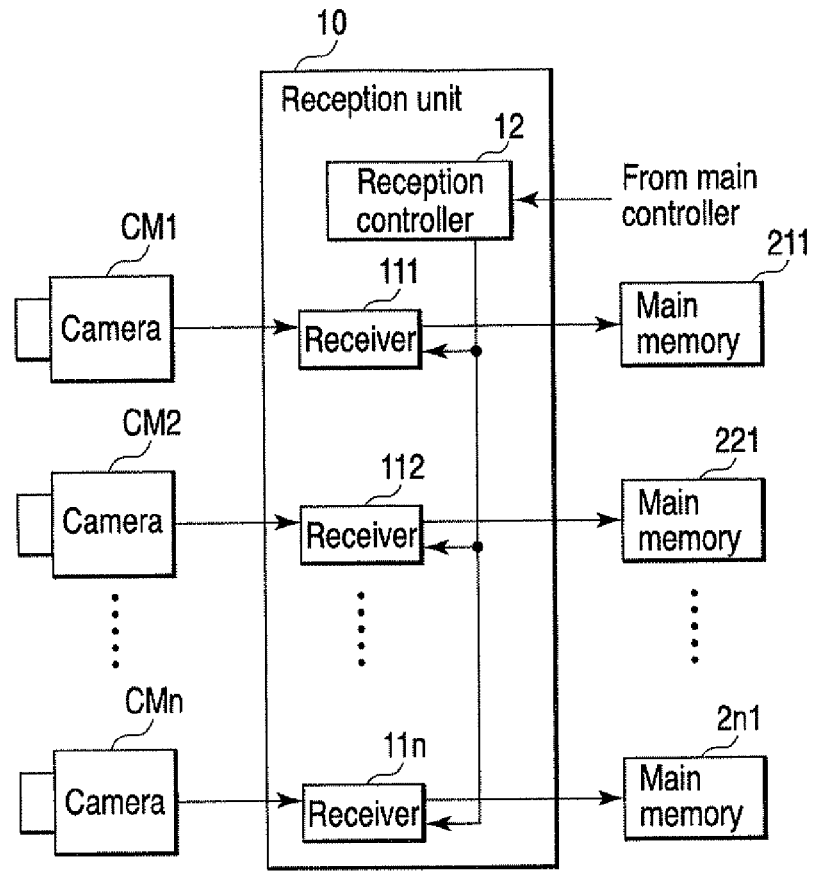
FIG. 2 is a block diagram showing the arrangement of a reception unit provided for the video display apparatus shown in FIG. 1.

Embodiments of the present invention will be described below with reference to the accompanying drawings.

First Embodiment

FIG. 1 is a block diagram showing the arrangement of a video display apparatus according to the first embodiment of the present invention. A video display apparatus 1 has a function of receiving video signals sent from a plurality of cameras CM1 to CMn set up at different positions, and displaying the received video signals. The video display apparatus 1 includes a reception unit 10, a plurality of storage units 21 to 2n provided in correspondence with the cameras CM1 to CMn, a main display 30, a sub-display unit 40, a plurality of sub-displays 41 to 4k, and a control unit. The sub-display unit 40 includes a plurality of sub-displays 41 to 4k. The control unit includes a main controller 50, switching unit 51, display memory 52, and display controller 53. Note that the main controller 50 and display controller 53 are implemented by causing a central processing unit (CPU) of a computer to execute application programs.

As shown in FIG. 2, for example, the reception unit 10 includes a plurality of receivers 111 to 11n which are provided in a one-to-one correspondence with the cameras CM1 to CMn, and a reception controller 12. The reception controller 12 controls the receivers 111 to 11n to selectively receive the video signals of the cameras CM1 to CMn as reception targets in accordance with a video selection control signal output from the main controller 50. The main controller 50 generates the video selection control signal in response to a video selection operation performed on a console OU. Under the control of the reception controller 12, each of the receivers 111 to 11n receives the video signal to be monitored which has been sent from a corresponding one of the cameras CM1 to CMn. After that, each of the receivers 111 to 11n converts the received video signal into video data by digitization processing, and then writes the data into a corresponding one of main memories 211 to 2n1 within the storage units 21 to 2n.

The storage units 21 to 2n include the main memories 211 to 2n1, replication units 212 to 2n2, and sub-memory groups 213 to 2n3, respectively. The main memories 211 to 2n1 store the video data output from the respective receivers 111 to 11n as described above. The replication units 212 to 2n2 respectively read out the video data from the main memories 211 to 2n1 and generate still video data from the readout video data at preset sampling intervals. After that, the replication units 212 to 2n2 supply the generated still video data to the respective sub-memory groups 213 to 2n3. The sub-memory groups 213 to 2n3 respectively include sub-memories 2131 to 213j, 2231 to 223j, ..., 2n31 to 2n3j, the number of which is an integral multiple of the number of the sub-displays 41 to 4k. The sub-memory groups 213 to 2n3 sequentially store still video data each including a plurality of frames, which are supplied from the replication units 212 to 2n2.

The switching unit 51 includes a video switch. In accordance with the video selection control signal output from the main controller 50, the switching unit 51 selectively reads out, from the main memories 211 to 2n1 of the storage units 21 to 2n at a certain period, live video data immediately after receiving them from the receivers 111 to 11n, and then supplies the readout live video data to the display memory 52. The display memory 52 includes, e.g., a video RAM, which provides the live video data supplied from the switching unit 51 to the main display 30 to display them.

In accordance with a sub-video selection control signal output from the main controller 50, the display controller 53 reads out from the sub-memory groups 213 to 2n3 of the storage units 21 to 2n the still video data of sections which have not been displayed on the main display 30, in synchronization with the display operation of the live video data on the main display 30. The display controller 53 then supplies the readout still video data to the sub-displays 41 to 4k to display them.

Figure 3:
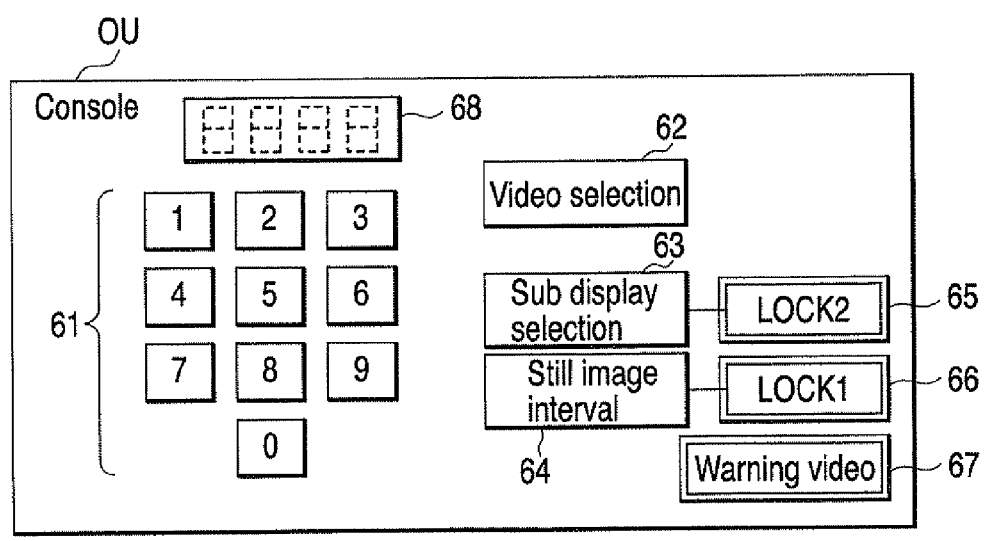
FIG. 3 is a view showing the arrangement of a console for inputting operation information to the video display apparatus shown in FIG. 1.

The console OU is provided for a terminal for the operator, and is connected to the video display apparatus 1 via, e.g., a signal cable. FIG. 3 is a view showing the arrangement of the console OU. Note that the console OU may be connected via a communication network such as a Local Area Network (LAN) or public network in place of the signal cable. The console OU includes numeric keys 61, a video selection button 62, a sub-display selection button 63, a still video interval setting button 64, lock buttons 65 and 66, a warning video display button 67, and a display 68. The numeric keys 61 are used to input information representing the number of one of the cameras CM1 to CMn or the interval of the still video data. The number input through the numeric keys 61 is displayed on the display 68.

When the number of one of the cameras CM1 to CMn is specified/input through the numeric keys 61 and the video selection button 62 is pressed, the main controller 50 instructs the switching unit 51 to switch the video data displayed on the main display 30 to that corresponding to the specified/input camera. When one of the cameras CM1 to CMn is specified through the numeric keys 61 and the sub-display selection button 63 is pressed, the main controller 50 instructs the display controller 53 to switch the still video data displayed on the sub-displays 41 to 4k to that corresponding to the specified/input camera. Furthermore, when a numerical value representing the display interval of the still video data is input through the numeric keys 61 and the still video interval setting button 64 is pressed, the main controller 50 changes the interval of the still video data displayed on the sub-displays 41 to 4k to the input value.

When the lock button 65 is operated, the main controller 50 instructs the display controller 53 to stop the update operation of the still videos displayed on the sub-displays 41 to 4k. When the lock button 66 is operated, the main controller 50 instructs the display controller 53 to fix the display interval of the still video data. When the warning video display button 67 is pressed, the main controller 50 instructs the display controller 53 to display only warning videos on the sub-displays 41 to 4k.

A video display operation by the apparatus having the above-described arrangement will be explained below.

Figure 4:
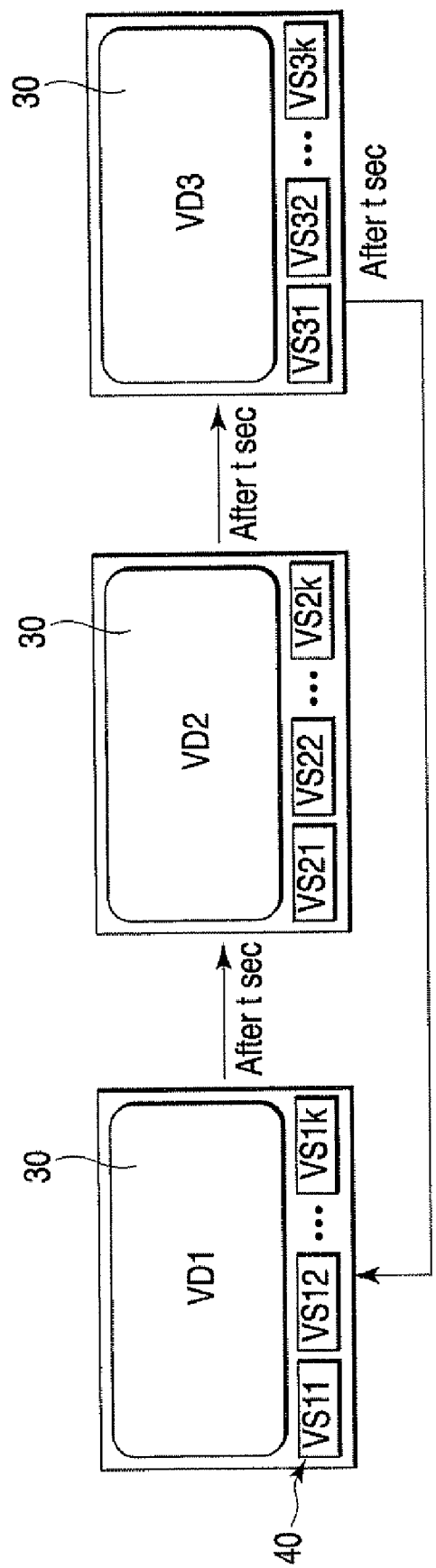
FIG. 4 is a view showing an overview of a video display operation on a main display and sub-displays of the video display apparatus shown in FIG. 1.

As shown in FIG. 4, for example, a case in which videos VD1, VD2, and VD3 of the cameras CM1 to CM3 of the cameras CM1 to CMn are time-divisionally monitored at a certain period t (e.g., t=1 sec) will now be described by way of example.

When a monitoring operation starts, the receivers 111 to 11n receive video signals sent from the respective cameras CM1 to CMn. The received signals are converted into video data by digitization processing, and stored in the respective main memories 211 to 2n1. The replication units 212 to 2n2 reads out the video data stored in the respective main memories 211 to 2n1. Still video data are generated based on the video data at the preset sampling intervals. The generated still video data are sequentially stored in j sub-memories of a corresponding one of the sub-memory groups 213 to 2n3. After the still video data are stored in all of the first to jth sub-memories, new still video data are sequentially stored in the first to jth sub-memories again.

Upon start of the reception of the video signals, in accordance with a video selection control signal from the main controller 50, the switching unit 51 sequentially and selectively reads out the video data corresponding to the video signals of the camera CM1 CM2, and CM3 from the main memories 211, 221, and 231 at the certain period t (e.g., t=1 sec), and displays the readout data on the main display 30 via the display memory 52. This allows the operator to time-divisionally monitor the live videos VD1, VD2, and VD3, which have been captured by the three cameras CM1, CM2, and CM3, by the certain period t (e.g., t=1 sec) by using the main display 30.

Figure 5:
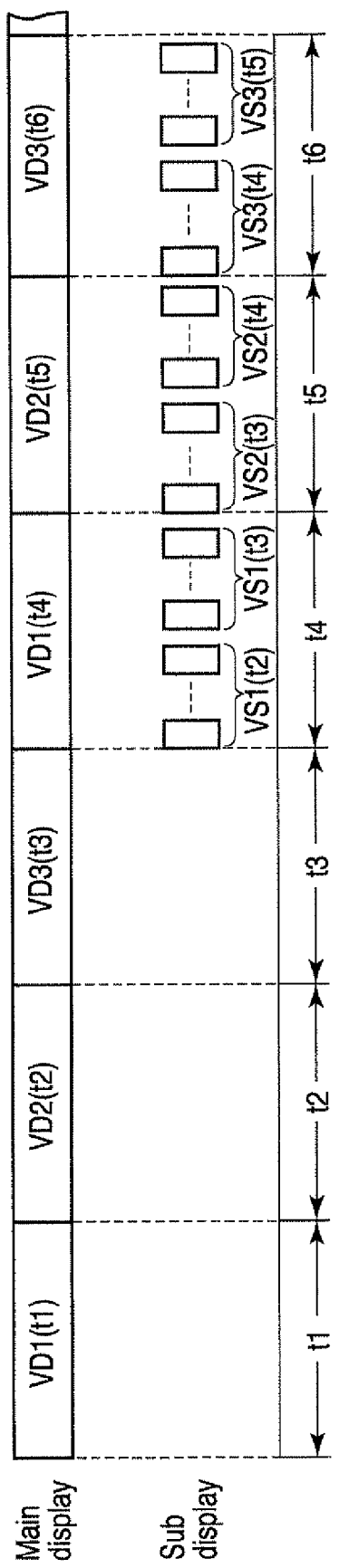
FIG. 5 is a timing chart showing details of the display operation on the main display and sub-displays of the video display apparatus shown in FIG. 1.

On the other hand, along with the display operation of the live videos VD1, VD2, and VD3 on the main display 30, the display controller 53 controls to display the sections of the live videos VD1, VD2, and VD3, which have not been displayed on the main display 30. FIG. 5 is a view for explaining the operation.

That is, during the period when the live video VD1 of the camera CM1 is displayed on the main display 30, the display controller 53 reads out from the sub-memories 2131 to 213$j$ the still video data generated from the video signals of the immediately preceding section, which has not been displayed on the main display 30, of the video signals which have been captured by the camera CM1, and displays the readout still video data on the sub-displays 41 to 4$k$. Consequently, during a period t4 shown in FIG. 5, the immediately preceding section, which has not been displayed on the main display 30, of the video VD1 which has been captured by the camera CM1, i.e., still video groups VS1($t2$) and VS1($t3$) during periods t2 and t3 when the live videos VD2 and VD3 of other cameras CM2 and CM3 are displayed on the main display 30 are read out from the sub-memories 2131 to 213$j$. The readout still video groups VS1($t2$) and VS1($t3$) are then displayed on the sub-displays 41 to 4$k$.

During the period when the live video VD2 of the camera CM2 is displayed on the main display 30, the display controller 53 reads out from the sub-memories 2231 to 223$j$ still video data generated from the video signals of the immediately preceding section, which has not been displayed on the main display 30, of the video signals which have been captured by the camera CM2, and displays the readout still video data on the sub-displays 41 to 4$k$. Consequently, during a period t5 shown in FIG. 5, the immediately preceding section, which has not been displayed on the main display 30, of the video VD2 which has been captured by the camera CM2, i.e., still video groups VS2($t3$) and VS2($t4$) during the periods t3 and t4 when the live videos VD3 and VD1 of other cameras CM3 and CM1 are displayed on the main display 30 are read out from the sub-memories 2231 to 223$j$. The readout still video groups VS2($t3$) and VS2($t4$) are then displayed on the sub-displays 41 to 4$k$.

During the period when the live video VD3 of the camera CM3 is displayed on the main display 30, the display controller 53 reads out from the sub-memories 2331 to 233$j$ still video data of the immediately preceding section, which has not been displayed on the main display 30, of the video which has been captured by the camera CM3, and displays the readout still video data on the sub-displays 41 to 4$k$. Consequently, during a period t6 shown in FIG. 5, the immediately preceding section, which has not been displayed on the main display 30, of the video VD3 which has been captured by the camera CM3, i.e., still video groups VS3($t4$) and VS3($t5$) during the periods t4 and t5 when the live videos VD1 and VD2 of other cameras CM1 and CM2 are displayed on the main display 30 are read out from the sub-memories 2331 to 233$j$. The readout still video groups VS3($t4$) and VS3($t5$) are then displayed on the sub-displays 41 to 4$k$.

In this manner, during the period when the live video VD1, VD2, or VD3 of the camera CM1, CM2, or CM3 in displayed on the main display 30, the still video data of the immediately preceding section, which has not been displayed on the main display 30, of the video which has been captured by the cameras CM1, CM2, or CM3 are read out from the sub-memories 2331 to 233$j$, 2231 to 223$j$, or 2331 to 233$j$ and the readout still video VS1, VS2, or VS3 including a plurality of frames is displayed on the sub-displays 41 to 4$k$.

While time-divisionally and sequentially monitoring the live video VD1, VD2, or VD3 of the camera CM1, CM2, or CM3 on the main display 30, the operator can check the still video VS1, VS2, or VS3 of the immediately preceding section, which has not been displayed on the main display 30, of the live video VD1, VD2, or VD3 by using the sub-displays 41 to 4$k$. The video of the immediately preceding section which has not been displayed on the main display 30 is converted into the still video VS1, VS2, or VS3, and then displayed on the sub-displays 41 to 4$k$. If, therefore, abnormal events as monitoring targets appear in the video of the non-displayed section, they can be surely found and confirmed.

Second Embodiment

According to the second embodiment of the present invention, when still video VS1, VS2, or VS3 of an immediately preceding section which has not been displayed on a main display 30 is displayed on sub-displays 41 to 4$k$, the still video VS1, VS2, or VS3 is compared with a corresponding live video VD1, VD2, or VD3. If a difference larger than a predetermined amount is detected as a result of the comparison. On Screen Display data (OSD data) is generated, and corresponding still video data are added with the OSD data and then displayed.

FIG. 6 is a block diagram showing the functional arrangement of a display controller 54 provided for a video display apparatus 1 according to the second embodiment of the present invention. Note that the arrangements or functions of all the elements of the video display apparatus 1 other than the display controller 54 are the same as those of FIG. 1, and will be therefore described with reference to FIG. 1.

The display controller 54 of this embodiment includes an video comparison unit 541, OSD generation unit 542, and sub-display control unit 543. The functions of those units can be implemented by causing a CPU to execute application programs.

The video comparison unit 541 compares the still video VS1, VS2, or VS3 of the non-displayed section, which is read out from a sub-memory group 213, 223, or 233, with the corresponding live video VD1, VD2, or VD3 supplied to the main display 30 from the display memory 52 to detect a difference amount between them. The difference amount can be calculated by, e.g., accumulating the luminance difference values of pixels of a frame. The video comparison unit 541 determines whether the calculated difference amount between the videos is larger than a preset threshold. If the difference amount is larger than the threshold as a result of the determination, the video comparison unit 541 instructs the OSD generation unit 542 to generate OSD data.

When the video comparison unit 541 instructs the OS generation unit 542 to generate OS data, the OSD generation unit 542 generates OSD data for warning. As an example of the OSD data, a warning message such as "an abnormal event is detected", or a mark, color, or flashing light which represents that an abnormal event is detected is used.

The sub-display control unit 543 superimposes the OSD data generated by the OSD generation unit 542 on the still video data, in which abnormal events have been detected by the video comparison unit 541, of the still video data including k frames of the non-displayed section, which are read out from the sub-memory groups 213 to 2n3. The still video data on which the OSD data is superimposed are displayed on the sub-displays 41 to 4k.

With such arrangement, as shown in FIG. 7, if a difference amount which is larger than the threshold is detected between the live video VD1 and the still video VS12 of the past non-displayed section displayed on a sub-display group 40 during the period when the live video VD1 of the camera CM1 is displayed on the main display 30, the still video VS12 on which the OSD data is superimposed is displayed on the sub-display 42. Similarly, if difference amounts which are larger than the threshold are respectively detected between the live video VD2 of the camera CM2 and the still videos VS23 and VS2k of the past non-displayed section which are displayed on the sub-display group 40 during the period when the live video VD2 is displayed on the main display 30, the still videos VS23 and VS2k on which the OSD data are superimposed are displayed on the sub-displays 43 and 4k, respectively.

Displaying the OSD data enables the operator to recognize the occurrence of an abnormal event without fail.

Assume that the operator who confirms the still videos on which the OSD data are superimposed presses a warning video display button 67 on the console OU. In response to this, the display controller 53 cancels the display of the still videos on which the OSD data are not superimposed, and only displays, on the sub-displays, the still video data on which the OSD data are superimposed. As shown in FIG. 7, for example, the display controller 53 displays the still videos VS23 and VS2k on the sub-displays 41 and 42, respectively. With this operation, the operator can intensively check the still videos VS23 and VS2k in which abnormal events have been detected.

If the warning video display button 67 is pressed, the display controller 53 may stop switching the live video VD1 on the main display 30. This makes it possible to continuously check the current situation as a monitoring target in which an abnormal event has been detected.

Third Embodiment

In the first embodiment, the still videos of the non-displayed section of the live video VD1, VD2, or VD3 are displayed on the sub-displays 41 to 4k simultaneously with the display operation of the live video VD1, VD2, or VD3 on the main display 30. The present invention, however, is not limited to this. As shown in FIG. 8, for example, the still video data of the non-displayed section which are to be displayed on sub-displays 41 to 4k may be selected by the operation of the operator.

This can be done when the operator presses a sub-display selection button 63 of a console OU shown in FIG. 3. That is, the operator specifies/inputs the number of one of cameras CM1 to CMn through numeric keys 61, and then presses the sub-display selection button 63. With this operation, a main controller 50 instructs a display controller 53 to switch the display of the still video data. Consequently, the still video data displayed on the sub-displays 41 to 4k are switched to the videos VS21 to VS2k corresponding to the specified/input camera CM2.

Assume that after the switching operation of the still video data displayed on the sub-displays 41 to 4k, the operator presses a lock button 65. In this case, even if the live video displayed on the main display 30 is switched from VD1 to VD2, the still videos VS21 to VS2k displayed on the sub-displays 41 to 4k remain displayed, as shown in FIG. 8.

Note that any one of the live videos VD1, VD2, and VD3 to be displayed on the main display 30 may also be selected in accordance with the operation of the operator.

Fourth Embodiment

According to the first and second embodiments, still video data including a plurality of frames is generated from the video data of a section which has not been displayed on the main display 30 and the generated still video data is displayed on the sub-displays 41 to 4k. The present invention, however, is not limited to this. The video data of the section which has not been displayed on the main display 30 may be displayed on the sub-displays by playing back in a fast-forward mode.

In this case, if there are n cameras for time-divisionally displaying the live video data on the main display 30, a fast-forward playback speed may be set to (n−1)-fold. As shown in FIG. 5, for example, if the video data of the three cameras CM1 to CM3 are time-divisionally and sequentially displayed at a certain period t, the video data of the sections which have not been displayed on the main display 30 are displayed at 2× speed.

With this operation, it is possible to display, within a shorter period of time, all the video data of the sections which have not been displayed on the main display 30.

Other Embodiments

In the first embodiment, during the period when the live video VD1 of the camera CM1 is displayed on the main display 30, the still video data including a plurality of frames of the immediately preceding section, which has not been displayed on the main display 30, of the video data which has been captured by the camera CM1 is displayed on the sub-displays 41 to 4k. The present invention, however, is not limited to this. During the period when the live video VD1 of the camera CM1 is displayed on the main display 30, for example, the still video VS1 including a plurality of frames of the non-displayed section of the video which has been captured by another camera CM2 or CM3 may be displayed on the sub-displays 41 to 4k.

The still video data displayed on the sub-displays 41 to 4k need not always be that of the non-displayed section immediately before the live video being displayed on the main display 30, and may be the still video data of the non-displayed section preceding that section. The still video data to be displayed on the sub-displays 41 to 4k is not limited to that of the non-displayed section and the video data which has been displayed on the main display 30 may be displayed again in accordance with the operation of the operator. In this case, still video data including a plurality of frames is generated based on the video data to be displayed again, and then displayed on the sub-displays 41 to 4k.

While a display apparatus including the main display 30 and the plurality of sub-displays 41 to 4k which are laid out below the main display 30 has been explained by way of example in the above embodiments, the layout of the displays is not limited to this and various modifications can be made. FIGS. 9 to 12 are views showing some examples.

FIG. 9 shows an example in which a plurality of sub-displays 40B are arranged below a main display 30B. This makes it possible to simultaneously display the non-displayed sections of the videos of the cameras CM1 to CM3.

FIG. 10 shows an example in which a plurality of sub-displays 40C are arranged within the display area of a main display 30C. This can be implemented by adopting, e.g., Picture in Picture (PinP).

FIG. 11 shows an example in which a plurality of main displays 30D1 to 30D4 are arranged, and groups 40D1 to 40D4 of a plurality of sub-displays are arranged below the respective main displays 30D1 to 30D4. With this arrangement, it is possible to display the live videos VD1 to VD4 of the cameras CM1 to CM4 on the main displays 30D1 to 30D4, respectively, while it is possible to display the still video data of the past non-displayed sections of the cameras CM1 to CM4 on the sub-display groups 40D1 to 40D4, respectively.

FIG. 12 shows an example in which the main display 30 and a plurality of sub-displays 40E1 to 40E3 each having the same size as that of the main display 30 are arranged.

In the first embodiment, each of the cameras CM1 to CMn are connected to a corresponding one of the receivers 111 to 11n of the video display apparatus 1 via a separate signal cable. The present invention, however, is not limited to this. The cameras CM1 to CMn can be network cameras having a communication interface function. The reception unit 10 of the video display apparatus 1 may receive, via a communication network such as an IP network, circuit switched network, or wireless LAN, digital video data sent from those cameras CM1 to CMn.

Note that the present invention is not directly limited to the above embodiments, and can be embodied by modifying constituent elements without departing from the scope of the invention when it is practiced. Also, various inventions can be formed by appropriately combining a plurality of constituent elements disclosed in the embodiments. For example, some of all the constituent elements disclosed in the embodiments may also be deleted. Furthermore, constituent elements over different embodiments may also be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video display apparatus comprising:
a reception unit configured to receive a plurality of sequence of video signals output from a plurality of cameras;
a storage unit configured to store the plurality of sequence of video signals received by the reception unit;
a display unit configured to include first and second display areas; and
a control unit;
the control unit comprising:
a first controller configured to selectively and time-divisionally display the plurality of sequence of video signals received by the reception unit on the first display area;
a second controller configured to generate, during a period when a video signal of a first camera is displayed on the first display area, a plurality of still videos in time sequence on the basis of video signals of a section, which has not been displayed on the first display area, of video signals which have been captured by the first camera, and display the plurality of generated still videos on the second display area; and
a third controller configured to compare each of the plurality of generated still videos with the same sequence of video signals as the corresponding still videos which are displayed on the first display area to calculate the difference between them, and if the difference is equal to or larger than a preset threshold, generates warning information, adds the generated warning information to the corresponding still video, and displays the still video on the second display area.

2. The apparatus according to claim 1, wherein the control unit accepts input of a numerical value representing a generating interval of the still videos, and generates the plurality of still videos at time intervals represented by the accepted numerical value.

3. The apparatus according to claim 1, wherein when the still video added with the warning information is displayed on the second display area and an operation for requesting to check the still video added with the warning information is performed, the control unit cancels the display of the still videos other than that added with the warning information, and only displays the still video added with the warning information on the second display area.

4. The apparatus according to claim 3, wherein when an operation for requesting to check the still video added with the warning information is performed, the control unit continues to display the same sequence of video signals as the still video added with the warning information on the first display area.

5. The apparatus according to claim 1, wherein when the non-displayed section of the video signals displayed on the second display area is longer than a display period of a sequence of video signals on the first display area, the first controller of the control unit converts a speed of the non-displayed section of the video signals, and displays the non-displayed section on the second display area in a fast-forward mode.

6. A video display method comprising steps of:
receiving a plurality of sequence of video signals output from a plurality of cameras;
storing the plurality of sequence of received video signals in a storage unit;
selectively and time-divisionally displaying the plurality of sequence of received video signals on a first display area;

generating, during a period when video signals of a first camera are displayed on the first display area, a plurality of still videos in time sequence on the basis of still videos of a section, which has not been displayed on the first display area, of video signals which have been captured by the first camera, and displaying the plurality of generated still videos on the second display area; and comparing each of the plurality of generated still videos with the same sequence of video signals as the corresponding still videos which are displayed on the first display area to calculate the difference between them, and if the difference is equal to or larger than a preset threshold, generating warning information, adding the generated warning information to the corresponding still video, and displaying the still video on the second display area.

7. The method according to claim 6, wherein in the step of displaying the non-displayed section of the video signals on the second display area, input of a numerical value representing a generating interval of the still videos is accepted and the plurality of still videos are generated at time intervals represented by the accepted numerical value.

8. The method according to claim 6, wherein in the step of displaying the non-displayed section of the video signals on the second display area, when the still video added with the warning information is displayed on the second display area and an operation for requesting to check the still video added with the warning information is performed, the display of the still videos other than that added with the warning information is canceled and only the still video added with the warning information is displayed on the second display area.

9. The method according to claim 8, wherein in the step of displaying the non-displayed section of the video signals on the second display area, when an operation for requesting to check the still video added with the warning information is performed, the same sequence of video signals as the still video added with the warning information continue to be displayed on the first display area.

10. The method according to claim 6, wherein in the step of displaying the non-displayed section of the video signals on the second display area, when the non-displayed section of the video signals displayed on the second display area is longer than a display period of a sequence of video signals on the first display area, a speed of the non-displayed section of the video signals is converted and the non-displayed section is displayed on the second display area in a fast-forward mode.

* * * * *